US010990588B2

(12) United States Patent
Amrhein et al.

(10) Patent No.: US 10,990,588 B2
(45) Date of Patent: *Apr. 27, 2021

(54) OPTIMIZING CONTINUOUS QUERY OPERATIONS IN AN IN MEMORY DATA GRID (IMDG)

(71) Applicant: International Business Machines Corporation, Armonk, NY (US)

(72) Inventors: Dustin K. Amrhein, Zachary, LA (US); Douglas Berg, Rochester, MN (US); Nitin Gaur, Round Rock, TX (US); Benjamin M. Parees, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/533,756

(22) Filed: Aug. 6, 2019

(65) Prior Publication Data

US 2019/0361887 A1    Nov. 28, 2019

Related U.S. Application Data

(63) Continuation of application No. 14/841,306, filed on Aug. 31, 2015, now Pat. No. 10,394,800, which is a
(Continued)

(51) Int. Cl.
*G06F 16/00*  (2019.01)
*G06F 16/242*  (2019.01)
(Continued)

(52) U.S. Cl.
CPC ...... *G06F 16/2425* (2019.01); *G06F 16/1847* (2019.01); *G06F 16/2455* (2019.01); *G06F 16/24542* (2019.01); *G06F 16/24568* (2019.01)

(58) Field of Classification Search
CPC .................................................. G06F 16/2425
See application file for complete search history.

(56) References Cited

U.S. PATENT DOCUMENTS 7,979,412 B2    7/2011  Johnson et al.
8,103,660 B2    1/2012  Hupfer et al.
(Continued)

OTHER PUBLICATIONS

List of IBM Patents or Patent Applications Treated as Related, Signed Jan. 31, 2020, 2 pages.

*Primary Examiner* — Ajith Jacob
(74) *Attorney, Agent, or Firm* — Alex Harvey

(57) ABSTRACT

Embodiments of the invention provide a method, system and computer program product for optimized continuous query processing in an in memory data grid (IMDG). In an embodiment of the invention, a method for optimized continuous query processing in an IMDG includes receiving a request to add an object to an IMDG. The method also includes evaluating a continuous query upon the object in order to produce a result. The method yet further includes adding an attribute to the object referencing the continuous query and assigning a value to the attribute of the result. The method even yet further includes inserting the object with the attribute into the IMDG. Finally, the method includes returning the value of the attribute in lieu of repeating an evaluation of the continuous query in response to receiving a request to repeat an evaluation of the continuous query in respect to the object.

12 Claims, 1 Drawing Sheet

Related U.S. Application Data continuation of application No. 14/580,152, filed on Dec. 22, 2014, now Pat. No. 9,613,087.

(51) Int. Cl.
  *G06F 16/18*   (2019.01)
  *G06F 16/2455*  (2019.01)
  *G06F 16/2453*  (2019.01)

(56) References Cited

U.S. PATENT DOCUMENTS

| | | |
|---|---|---|
| 9,613,087 B2 | 4/2017 | Amrhein et al. |
| 10,394,800 B2 | 8/2019 | Amrhein et al. |
| 2013/0339392 A1 | 12/2013 | Gaur et al. |
| 2014/0095540 A1 | 4/2014 | Hsiao et al. |

OPTIMIZING CONTINUOUS QUERY OPERATIONS IN AN IN MEMORY DATA GRID (IMDG)

CROSS-REFERENCE TO RELATED APPLICATIONS

This application is a Continuation of U.S. patent application Ser. No. 14/841,306, filed Aug. 31, 2015, which is a Continuation of U.S. patent application Ser. No. 14/580,152, filed Dec. 22, 2014, the entirety of each which is incorporated herein by reference.

BACKGROUND OF THE INVENTION

Field of the Invention

The present invention relates to database query processing and more particularly to database query processing in an in memory data grid (IMDG).

Description of the Related Art

Database query processing refers to the receipt and execution of data queries against a database. Flat file databases generally process queries in accordance with a key used to locate matching records and to return the matching records to the requestor. To the extent that data is to be culled from different related records, a series of queries are required to located different keys in different database tables so as to ultimately return the desired set of data. Relational databases improve upon flat file databases by permitting the logical joining together of different tables so as to execute a single query against the joined set of tables in order to produce a desired set of data.

An in memory data grid (IMDG) is a highly distributable form of a database that permits parallel processing across a set of disparately located computing devices. The use of an IMDG permits substantial parallelization of database operations and, in consequence, efficient utilization of unused processing resources in each host computing device supporting the IMDG. To the extent that data in the IMDG is highly distributed, relational database concepts cannot be effectively applied. Thus, though highly scalable, database operations in an IMDG are substantially granular and numerous in comparison to that of a traditional relational database.

In many cases, users of an IMDG must apply a continuous query to the application objects in the IMDG. That is to say, whenever an object is inserted into, updated in, or removed from an IMDG, users may choose to apply a query to the object and to acquire a returned result of the query. While simple queries, such as checking the value of a single application object attribute, do not threaten to significantly diminish performance, complex or nested queries may have a notable performance and scalability impact when continually applied in the IMDG. As performance and scalability are two expected benefits of an IMDG implementation, the execution of continuous queries can serve to undermine the value of the entire grid.

BRIEF SUMMARY OF THE INVENTION

Embodiments of the present invention address deficiencies of the art in respect to continuous query processing in an IMDG and provide a novel and non-obvious method, system and computer program product for optimized continuous query processing in an IMDG. In an embodiment of the invention, a method for optimized continuous query processing in an IMDG includes receiving a request to add an object to an IMDG. The method also includes evaluating a continuous query upon the object in order to produce a result. The method yet further includes adding an attribute to the object referencing the continuous query and assigning a value to the attribute of the result. The method even yet further includes inserting the object with the attribute into the IMDG. Finally, the method includes returning the value of the attribute in lieu of repeating an evaluation of the continuous query in response to receiving a request to repeat an evaluation of the continuous query in respect to the object.

In one aspect of the embodiment, the attribute is added as a new data member of the object. In another aspect of the embodiment, the attribute the object is wrapped with a wrapper and the attribute is added as a new data member of the wrapper. In yet another aspect of the embodiment, the method additionally includes receiving a request to subsequently evaluate a compound query in respect to the object. In this regard, the compound query includes therein the continuous query and at least one other query. As such, the compound query is evaluated using the value of the attribute in lieu of repeating an evaluation of the continuous query upon the object, and the value is combined with an evaluation of the at least one other query in order to produce a result to the compound query.

In another embodiment of the invention, a data processing system is configured for optimized continuous query processing. The system includes a host computing system that includes one or more computers, each with memory and at least one processor. The system also includes an IMDG operating in the memory of the host computing system. Finally, the system includes an optimized continuous query processing module coupled to the IMDG. The module includes program code enabled upon execution in the host computing system to receive a request to add an object to the IMDG, to evaluate a continuous query upon the object in order to produce a result, to add an attribute to the object referencing the continuous query and assigning a value to the attribute of the result, to insert the object with the attribute into the IMDG, and to return the value of the attribute in lieu of repeating an evaluation of the continuous query in response to receiving a request to repeat an evaluation of the continuous query in respect to the object.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for optimized continuous query processing in an IMDG. In accordance with an embodiment of the invention, an object disposed in an IMDG in response to an add or update operation can be evaluated against a continuous query. The result of the evaluation can be added as a value of an attribute of the object either as part of the object or in combination or association with the object. Thereafter, on a subsequent request to evaluate the continuous query, the attribute can be detected and the value of the attribute returned in lieu of re-evaluating the continuous query on the object. Optionally, when evaluating a compound continuous query, a pre-stored result in an affected object for a portion of the compound continuous query can be utilized in during the evaluation of the compound continuous query in lieu of performing a full evaluation of all conditions of the compound continuous query.

Figure 1:
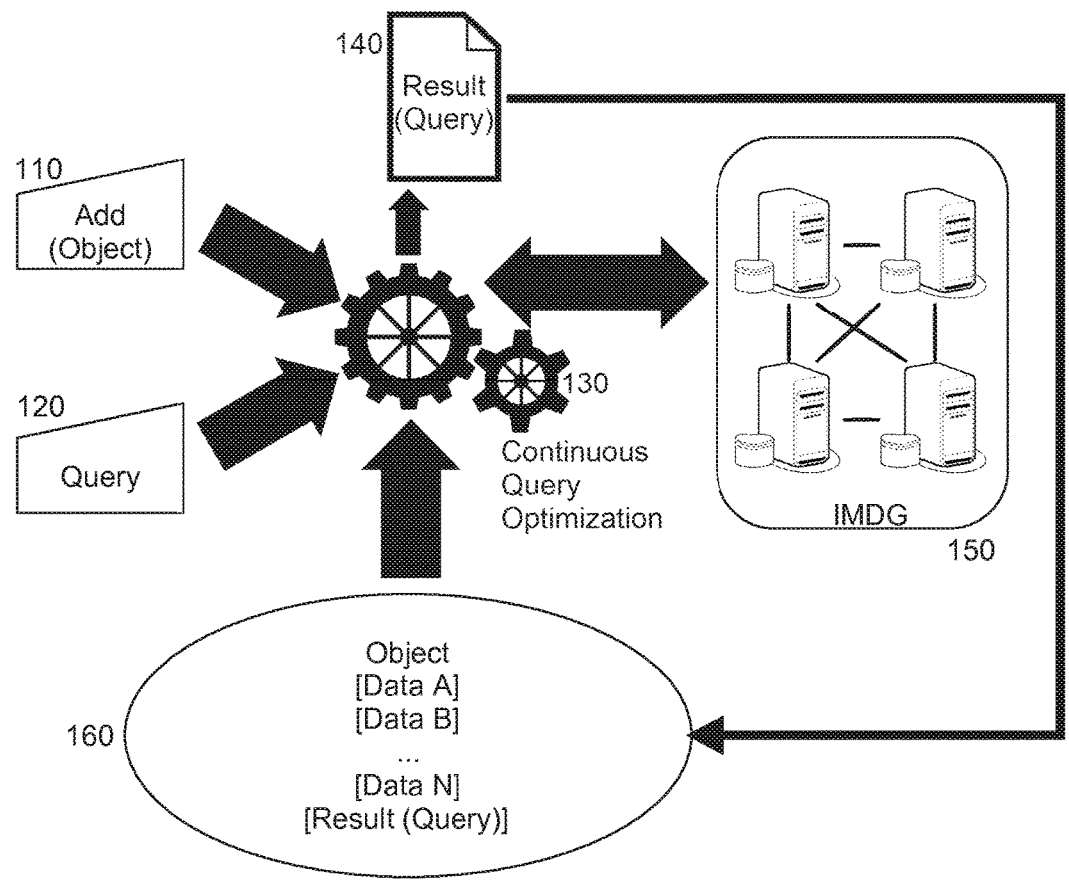
FIG. 1 is a pictorial illustration of a process for optimized continuous query processing in an IMDG.

In further illustration, FIG. 1 pictorially shows a process for optimized continuous query processing in an IMDG. As shown in FIG. 1, continuous query optimization logic 130 can receive a request 110 to add an object 160 to IMDG 150. The continuous query optimization logic 130 thereafter can evaluate query 120 upon the object 160 so as to produce a query result 140. Finally, the continuous query optimization logic 130 can associate the query result 140 with the object 160, for instance by wrapping the object 160 in a wrapper object that includes as a data member, the query result 140, or by adding the query result 140 as a data member of the object 160. Thereafter, when the query 120 is issued upon the IMDG 150, instead of evaluating the query 120 upon the object 160, the continuous query optimization logic 130 can retrieve the query result 140 from the object 160.

Figure 2:
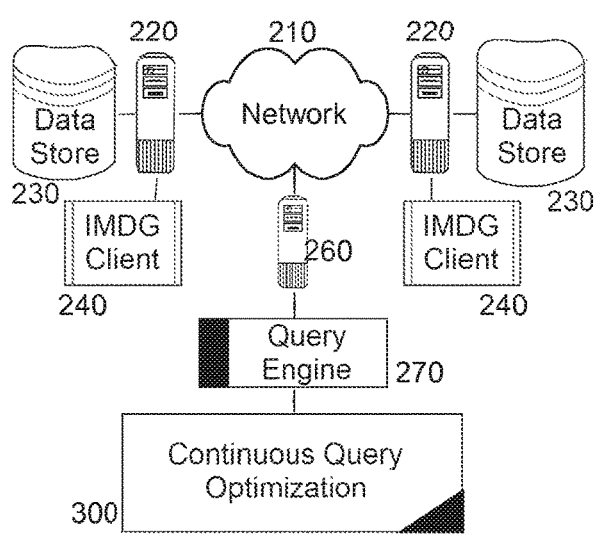
FIG. 2 is a schematic illustration of a data processing system configured for optimized continuous query processing in an IMDG; and, FIG. 3 is a flow chart illustrating a process for optimized continuous query processing in an IMDG.

The process described in connection with FIG. 1 can be implemented in a data processing system. In yet further illustration, FIG. 2 schematically shows a data processing system configured for optimized continuous query processing in an IMDG. The system can include a host computing system 260 that includes one or more computers each with at least one processor and memory. The host computing system 260 can be configured for coupling to one or more different clients over computer communications network 210. The host computing system 260 further can be configured for coupling to an IMDG that includes different nodes, each of the nodes providing a computing system 220, a data store 230 in which data is stored, and an IMDG client 240 configured to respond to requests to store and retrieve data from the data store 230. The host computing system 260 can support the operation of a query engine 270. The query engine 270 can be configured to process queries against objects stored in the different data stores 240 of the IMDG through the IMDG clients 240. Of note, a continuous query optimization module 300 can be coupled to the query engine 270.

The query optimization module 300 can include program code enabled upon execution in the memory of the host computing system 260 to receive a request to add an object to the IMDG, to evaluate a continuous query upon the object in order to produce a result, to add an attribute to the object referencing the continuous query and to assign a value to the attribute of the result, to insert the object with the attribute into the IMDG, and to return the value of the attribute in lieu of repeating an evaluation of the continuous query in response to receiving a request to repeat an evaluation of the continuous query in respect to the object. The program code of the module 300 further is enabled to receive a request to subsequently evaluate a compound query in respect to the object. The compound query can include therein the continuous query and at least one other query. As such, the program code is enabled to evaluate the compound query using the value of the attribute in lieu of repeating an evaluation of the continuous query upon the object, and to combine the value with an evaluation of the at least one other query in order to produce a result to the compound query.

Figure 3:
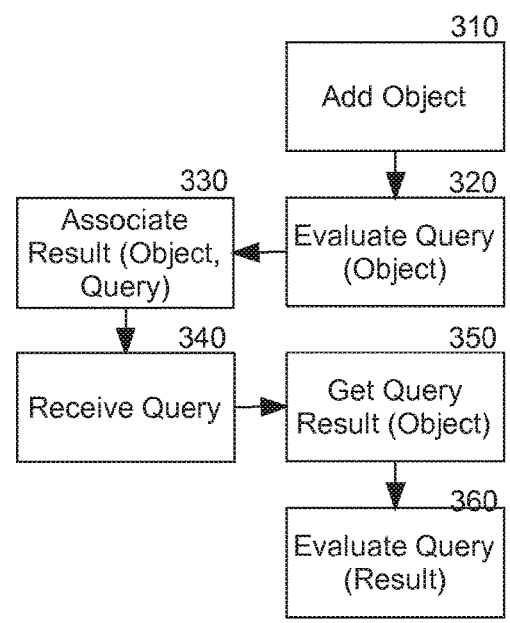

In even yet further illustration of the operation of the continuous query optimization module 300, FIG. 3 is a flow chart illustrating a process for optimized continuous query processing in an IMDG. Beginning in block 310, an object can be requested for addition to the IMDG. In block 320, a query can be evaluated against the object in order to produce a query result. In block 330, the query result is associated with the object, either directly as a data member of the object, or as a data member of a wrapper wrapping the object. Therefore, in block 340 the query can be received for evaluation against all objects in the IMDG. However, for the object to which the query result already had been associated, in block 350 the query result can be retrieved from the object and the query can be evaluated in block 360 utilizing the retrieved query result in lieu of re-evaluating the query against the object.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for optimized continuous query processing in an in memory data grid (IMDG), the method comprising:
receiving a request to add an object to an IMDG;
evaluating a compound continuous query upon the object in order to produce an evaluation for the compound continuous query, but in lieu of performing a full evaluation of all conditions of the compound continuous query, including in the evaluation, a pre-stored result retrieved from the object for a portion of the compound continuous query;

inserting the object with the evaluation into the IMDG; and returning the evaluation in lieu of repeating the evaluating of the compound continuous query in response to receiving a request to repeat the evaluating of the compound continuous query in respect to the object.

2. The method of claim 1, wherein the evaluation is added as a new data member of the object.

3. The method of claim 1, wherein the object is wrapped with a wrapper and the evaluation is added as a new data member of the wrapper.

4. The method of claim 1, further comprising:

receiving a request to subsequently evaluate a second compound query in respect to the object, the second compound query including therein the compound continuous query and at least one other query; and evaluating the second compound query using the evaluation in lieu of repeating the evaluating of the compound continuous query upon the object, and combining the evaluation with a second evaluation of the at least one other query in order to produce a result to the second compound query.

5. A data processing system configured for optimized continuous query processing, the system comprising:

a host computing system comprising one or more computers, each with memory and at least one processor;

an in memory data grid (IMDG) operating in the memory of the host computing system; and an optimized continuous query processing module coupled to the IMDG, the module comprising program code enabled upon execution in the host computing system to receive a request to add an object to the IMDG, to evaluate a compound continuous query upon the object in order to produce an evaluation for the compound continuous query, but in lieu of performing a full evaluation of all conditions of the compound continuous query, include in the evaluation, a pre-stored result retrieved from in the object for a portion of the compound continuous query, insert the object with the evaluation pre-stored result into the IMDG, to insert the object with the evaluation into the IMDG, and to return the evaluation in lieu of repeating the evaluating of the compound continuous query in response to receiving a request to repeat the evaluating of the compound continuous query in respect to the object.

6. The system of claim 5, wherein the evaluation is added as a new data member of the object.

7. The system of claim 6, wherein the object is wrapped with a wrapper and the evaluation is added as a new data member of the wrapper.

8. The system of claim 6, wherein the program code of the module is further enabled to receive a request to subsequently evaluate a second compound query in respect to the object, the second compound query including therein the compound continuous query and at least one other query, and to evaluate the second compound query using the evaluation in lieu of repeating the evaluating of the compound continuous query upon the object, and to combine the evaluation with a second evaluation of the at least one other query in order to produce a result to the second compound query.

9. A computer program product for optimized continuous query processing in an in memory data grid (IMDG), the computer program product comprising a computer readable storage medium having program instructions embodied therewith, the program instructions executable by a device to cause the device to perform a method comprising:

receiving a request to add an object to an IMDG;

evaluating a compound continuous query upon the object in order to produce an evaluation for the compound continuous query, but in lieu of performing a full evaluation of all conditions of the compound continuous query, including in the evaluation, a pre-stored result retrieved from the object for a portion of the compound continuous query;

inserting the object with the evaluation into the IMDG; and returning the evaluation in lieu of repeating the evaluating of the compound continuous query in response to receiving a request to repeat the evaluating of the compound continuous query in respect to the object.

10. The computer program product of claim 9, wherein the evaluation is added as a new data member of the object.

11. The computer program product of claim 10, wherein the object is wrapped with a wrapper and the evaluation is added as a new data member of the wrapper.

12. The computer program product of claim 10, further comprising:

receiving a request to subsequently evaluate a second compound query in respect to the object, the second compound query including therein the compound continuous query and at least one other query; and evaluating the second compound query using the evaluation in lieu of repeating the evaluating of the continuous query upon the object, and combining the evaluation with a second evaluation of the at least one other query in order to produce a result to the second compound query.

* * * * *